Patented May 14, 1946

2,400,375

UNITED STATES PATENT OFFICE 2,400,375

METHOD OF REFINING GELATIN

Samuel E. Sheppard and Robert C. Houck, Rochester, N. Y., assignors to Eastman Kodak Company, Rochester, N. Y., a corporation of New Jersey No Drawing. Application April 7, 1943,
Serial No. 482,222

7 Claims. (Cl. 260—118)

This invention relates to the removal of albumin from gelatin by treating an aqueous solution of the gelatin with a dehydrating agent under controlled conditions.

Various methods of refining gelatin have been suggested. However, those methods have never found practical application due to the disadvantages inherent therein. Many of these methods have involved the use of an elevated temperature. Such a temperature, however, has a tendency to reduce the viscosity of the gelatin so that ordinarily such a method is not of practical value. One object of our invention is to provide a method of removing the albumin from gelatin without appreciably lowering the viscosity of the gelatin. Other objects of our invention will appear herein.

In the manufacture of photographic films in which gelatin emulsions are employed, there are often impurities in the gelatin which affect the photosensitiveness of the emulsion. One of the materials which interferes with the sensitization of gelatin emulsions is albumin. Therefore, it is desirable that any albumin which is present in the gelatin be removed prior to its incorporation into a gelatin emulsion. If, for any reason, there are any other purposes for which a pure gelatin is desired, our invention may also be employed to refine the gelatin used in that connection.

We have found that an aqueous solution of gelatin readily lends itself to removal of the albumin therefrom if that material is first subjected to the action of a water-miscible organic dehydrating agent at a moderate temperature. Our invention involves the following steps providing a solid gelatin is employed as the starting material. If the gelatin is already in aqueous solution or as an aqueous gel which forms a solution at a slightly elevated temperature, it may be treated by the process described herein at the appropriate point for treating an aqueous solution of gelatin:

1. The gelatin is dissolved in warm water.
2. The pH is adjusted to 4.7 to 4.8.
3. The mass is converted to a temperature at which no gelatin is drawn out of solution.
4. The dehydrating agent is added to the solution.
5. The solution is aged until it is clarified and the albumin settles out.
6. Separation of the albumin from the gelatin solution.
7. The removal of the dehydrating agent from the gelatin solution.

The gelatin employed is dissolved in water, preferably warm water such as at a temperature of 50° C. It is desirable that the temperature remain at 50° C. as a higher temperature may break down or lower the viscosity of the gelatin. Obviously if a gelatin of lowered viscosity is not objectionable it is perfectly satisfactory to employ higher temperatures than 50° C. such as 60° C. or more to promote the dissolving of the gelatin. Some gelatins are completely soluble at temperatures below 50° C. and in those cases a temperature less than 50° C. could be used. However, in the average case a temperature of 50° C. is suitable. Although there is nothing critical about the concentration of gelatin in the aqueous solution, concentrations of from 4 up to 10% have been tried and have been found to be quite satisfactory. The most desirable concentration to use depends on the viscosity of the gelatin, the more dilute concentrations being adapted for the higher viscosity gelatins and vice versa. We prefer to use a solution of about 5% gelatin. If the gelatin is already in the form of a solution, or in the form of a gel which will become a solution upon warming, the individual operator may start out directly with the dissolved gelatin rather than go through the operation of forming a solution.

The second step involves the adjustment of the pH to a pH value of 4.7 to 4.8. As gelatin, particularly gelatin obtained from lime processed skins and hides and not deashed, has a pH value higher than 4.8, the addition of acid is ordinarily necessary to attain the desired pH. Acetic acid has been found eminently suitable for this purpose, although other acids may be employed unless they have some property or characteristic which would render them unsuitable for the particular purpose at hand. The pH value given is critical for the efficient dealbumination of gelatin. If the temperature of the gelatin solution is elevated, it is advisable that it be cooled before the adjustment of the pH for the reason that the usual pH indicators work only at temperatures below 45° C.

After the gelatin has been formed into a solution and the pH is adjusted, the material is cooled to a temperature high enough that substantially no gelation takes place, but low enough that very little effect on the viscosity results. If the temperature is reduced too much, some of the gelatin, particularly that having the higher molecular weight, might be thrown out of solution on ageing and the viscosity would thereby be reduced. The desired temperature is one at which no substantial reduction of the viscosity of the gelatin takes place. We have found a temperature of 35° C. to be most satisfactory and prefer to conduct the refining operation in accordance with our invention while maintaining the mass at that temperature. If, however, the maintaining of the temperature at a specified point, namely 35° C., is difficult, the operation may be carried out at a temperature within the range of 32–40° C., if under the conditions employed there is no substantial loss of viscosity of the gelatin. After the mass has been brought to the desired temperature for treatment, a water-miscible alcohol, ketone or keto-alcohol is added thereto. The amount of dehydrating agent which is added is that amount which will impart a turbidity to the mass equivalent to an optical density of less than 1 in a layer having a thickness of 2 cm. In addition of this dehydrating agent the first 60% of this material may be added fairly rapidly. In order to obtain a sharp separation, however, it is desirable that the last portion of the dehydrating agent be added slowly so that the turbidity point may be approached gradually, as otherwise some of the gelatin may be drawn from the solution and as the first gelatin that precipitates has the higher viscosity portion of the gelatin, it is desirable that substantially no precipitation of gelatin occur. The optical density value may vary some within the limitations given, depending upon the albumin concentration in the gelatin. For instance, with some gelatins more albumin may be present as an impurity than is present in other gelatins. The turbidity is determined by means of a turbidimeter and the values given are based upon the optical density of a 2 cm. layer. The optical density is defined as $D = -\log T$, where T is the transmitted intensity of radiant energy. Obviously, if a 1 cm. layer is employed to determine the optical density, the value employed as the end point will be equivalent to that given as the value to be used herein. It is ordinarily desirable that the turbidity be equivalent to an optical density of at least 0.4 in a 2 cm. layer and not higher than 1.0.

After the proper turbidity value is obtained, the solution is aged by allowing it to stand until clarification takes place and the albumin settles out as a thin layer. The albumin ordinarily present as an impurity in gelatin is in the order of $\frac{1}{10}$ of 1%. This amount, however, is sufficient to act as a desensitizer, cutting down the speed and gamma of a photographic emulsion made therefrom. After this clarification by standing, the clear gelatin solution is separated from the albumin layer in any desired manner, such as by decanting. Other methods, however, may be employed, such as the use of a super centrifuge, or by means of a filtering operation.

Unless one would desire to employ the gelatin directly as then obtained, mixed with a dehydrating agent, it is desirable that the dehydrating agent be removed. For instance, particularly in the case of some volatile dehydrating agents, removal may be accomplished by evaporation at reduced pressure or vacuum distillation. The use of the reduced pressure is to prevent the application of too high a temperature to the gelatin. Any method of removing the dehydrating agent which does not involve too high a temperature, and thereby reduce the viscosity of the gelatin, may be employed. One method of removing the dehydrating agent which has proved to be satisfactory is to remove but a little of the dehydrating agent, as by evaporation, follow by chilling, and forming the resulting gel in sheet or shred form when the dehydrating agent may then be washed out therefrom with water.

The dehydrating agents which have proved to be quite satisfactory are the liquid ketones, alcohols, and keto-alcohols which are water-miscible. Some materials of this type which are satisfactory are acetone, methyl ethyl ketone, methyl, ethyl or isopropyl alcohol, hydroxy-acetone, and the like. The use of the more volatile solvents for this purpose is preferred because of the ease of removal of those solvents from the gelatin. If, however, washing only is necessary for their removal, the volatility of the dehydrating agent is not particularly important. The following example illustrates the refining of gelatin in accordance with our invention:

600 grams of gelatin were made up in water solution by first swelling the gelatin for 12 hours, then heating with the requisite amount of water to make a volume of 8250 cc., at a temperature of 50° for 30 minutes. The pH was then adjusted to 4.8 by adding a small amount of acetic acid. The solution was cooled to a temperature of 35° C. and acetone was added at the rate of 50 cc. per minute until the optical density of a 2 cm. layer reached a value within the range of 0.4 to 0.6. This required 6230 cc. of acetone. The solution, including the acetone, was aged 18 hours at 35° C. At the end of this period a thin, opaque layer of albumin had settled out at the bottom of the container. The liquid was centrifuged through a Sharples supercentrifuge at 25,000 R. P. M. The acetone of the centrifuged solution, together with some water, was removed by evaporation at reduced pressure at a temperature not exceeding 35° C. When a sufficient concentration of the gelatin was reached to allow gelling upon cooling, the solution was gelled and the gel thus formed was sliced, washed and dried. The albumin content and viscosity of the gelatin before and after refining in accordance with our invention were found to be as follows:

| Gelatin | Albumin | Viscosity [1] |
|---|---|---|
|  | Percent | Centipoises |
| Original | 0.11 | 8.98 |
| Product | 0.018 | 8.06 |

[1] 7% soln. at 40°C., pH 4.9.

The lowering of the viscosity of gelatin by the process in accordance with our invention is much less than by a process in which a higher degree of heat is employed, but nevertheless the removal of albumin may be equally complete and a gelatin is obtained having value for photographic purposes in that it does not interfere with the increase of speed and gamma of a photographic emulsion in which it is prepared, nor does it contribute any fogging characteristics thereto. By the removal of the albumin from gelatin, a material is obtained having fairly standardized properties so that uniformity is obtained.

In adding of the dehydrating agent to the gelatin solution it was pointed out that this addition should take place slowly. The only criterion on the rate at which the dehydrating agent is to be added is that this material be added with sufficient slowness that permanent precipitation of gelatin does not result. As the end point is approached it is desirable that considerable care be used to obtain the sharpest separation of albumin from gelatin in this operation.

What we claim and desire to secure by Letters Patent of the United States is:

1. A method of refining gelatin, which comprises adding to an aqueous solution of gelatin containing albumin therein and having a pH of approximately 4.7–4.8, a neutral organic water-miscible liquid dehydrating agent selected from the groups consisting of the water-miscible ketones, alcohols, and keto-alcohols at a temperature of 32–40° C. in a quantity sufficient to produce a turbidity equivalent to an optical density of 0.4–1 in a 2-cm. layer whereby the albumin therein is precipitated and removing therefrom the albumin which has precipitated.

2. A method of refining gelatin, which comprises adding to an aqueous solution of gelatin containing albumin therein, and having a pH of approximately 4.7–4.8, a water-miscible ketone at a temperature of 32–40° C. in a quantity sufficient to produce a turbidity equivalent to an optical density of 0.4–1 in a 2-cm. layer, whereby the albumin therein is precipitated and removing therefrom the albumin which has precipitated.

3. A method of refining gelatin, which comprises adding to an aqueous solution of gelatin containing albumin therein and having a pH of approximately 4.7–4.8, a water-miscible alcohol at a temperature of 32–40° C. in a quantity sufficient to produce a turbidity equivalent to an optical density of 0.4–1 in a 2-cm. layer, whereby the albumin therein is precipitated and removing therefrom the albumin which has precipitated.

4. A method of refining gelatin, which comprises adding to an aqueous solution of gelatin containing albumin therein and having a pH of approximately 4.7–4.8, a water-miscible keto-alcohol at a temperature of 32–40° C. in a quantity sufficient to produce a turbidity equivalent to an optical density of 0.4–1 in a 2-cm. layer and removing therefrom the albumin which has precipitated.

5. A method of refining gelatin, which comprises adding to an aqueous solution of gelatin containing albumin therein, and having a pH of approximately 4.7–4.8, acetone, at a temperature of 32–40° C. in a quantity sufficient to produce a turbidity equivalent to an optical density of 0.4–1 in a 2-cm. layer, whereby the albumin therein is precipitated and removing therefrom the albumin which has precipitated.

6. A method of refining gelatin, which comprises adding to an aqueous solution of gelatin containing albumin therein and having a pH of 4.7–4.8, hydroxy acetone at a temperature of 32–40° C. in a quantity sufficient to produce a turbidity equivalent to an optical density of 0.4–1 in a 2-cm. layer, whereby the albumin therein is precipitated and removing therefrom the albumin which has precipitated.

7. A method of refining gelatin having albumin therein, which gelatin has a pH of greater than 4.7–4.8, which comprises adding acid to its aqueous solution to impart a pH of approximately 4.7–4.8 thereto, and then adding to the solution, a water-miscible ketone at a temperature of 32–40° C. in a quantity sufficient to produce a turbidity equivalent to an optical density of 0.4–1 in a 2-cm. layer, whereby the albumin therein is precipitated and removing therefrom the albumin which has precipitated.

SAMUEL E. SHEPPARD.
ROBERT C. HOUCK.